(12) United States Patent
Milligan

(10) Patent No.: US 12,460,407 B2
(45) Date of Patent: *Nov. 4, 2025

(54) PERIMETER BARRIER FOR A BUILDING STRUCTURE

(71) Applicant: Strong Skirt LLC, Tulsa, OK (US)

(72) Inventor: Christopher Milligan, Georgetown, TX (US)

(73) Assignee: STRONG SKIRT LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/927,622

(22) Filed: Oct. 25, 2024

(65) Prior Publication Data

US 2025/0116106 A1   Apr. 10, 2025

Related U.S. Application Data

(63) Continuation-in-part of application No. 18/625,516, filed on Apr. 3, 2024, now Pat. No. 12,221,783, which is a continuation of application No. 18/377,480, filed on Oct. 6, 2023, now Pat. No. 12,012,747.

(51) Int. Cl.
   *E04B 1/343*   (2006.01)
(52) U.S. Cl.
   CPC .................. *E04B 1/34342* (2013.01)
(58) Field of Classification Search
   CPC ............. E04B 1/34342; E04B 1/34352; E06B 2009/005; Y10S 52/03; B62D 33/046
   USPC ...................................... 52/169.12
   See application file for complete search history.

(56) References Cited

U.S. PATENT DOCUMENTS

| | | | | |
|---|---|---|---|---|
| 1,269,133 | A | * | 6/1918 | Townsend ........... E05D 15/0656 16/93 R |
| D158,043 | S |   | 4/1950 | Bevington |
| 2,618,493 | A | * | 11/1952 | Fransen, Sr. .............. B60P 3/32 296/168 |
| 2,961,255 | A | * | 11/1960 | Trott ........................ B60P 3/32 52/63 |
| 3,106,411 | A | * | 10/1963 | Holmes .................. B62D 53/06 52/489.1 |
| 3,113,357 | A | * | 12/1963 | Reukauf ................. E06B 7/082 D25/60 |
| 3,452,501 | A | * | 7/1969 | Sickler ..................... E04H 4/00 52/798.1 |

(Continued)

FOREIGN PATENT DOCUMENTS

| JP | H10140929 A | 11/1996 |
|---|---|---|
| JP | 2001146850 A | 5/2001 |

OTHER PUBLICATIONS

Shane Davis, Preliminary Patentability Search dated Sep. 11, 2023 (Sep. 11, 2023), 2 pages, Covalent Patent Research.
Product Specification Guide, Strong Skirt, LLC. 2017, 20 pages.

*Primary Examiner* — James M Ference
(74) *Attorney, Agent, or Firm* — Dickinson Wright PLLC

(57) ABSTRACT

A kit for a perimeter barrier for a building includes a panel, a j-track configured to be coupled to a bottom of the panel, a top track coupled to the building such that the top track is secured to an upper portion of the panel, a top h-track configured to be coupled to the panel and the top track, and a bottom h-track configured to be mounted to the panel and the j-track.

20 Claims, 18 Drawing Sheets

(56) References Cited

U.S. PATENT DOCUMENTS

| | | | | |
|---|---|---|---|---|
| 3,562,983 A * | 2/1971 | Rector | ............... | B60P 3/32 52/530 |
| 3,571,998 A * | 3/1971 | Iacona | ............... | E04B 1/34342 52/798.1 |
| 3,636,661 A * | 1/1972 | Strawsine | ............... | E06B 3/4663 312/304 |
| 3,694,979 A * | 10/1972 | Vadnie | ............... | E04B 1/34342 49/55 |
| 3,710,525 A * | 1/1973 | Lopes | ............... | B60P 3/32 52/169.12 |
| 3,712,005 A * | 1/1973 | Eschbach | ............... | E04B 2/78 296/191 |
| 3,722,156 A * | 3/1973 | Bryant | ............... | B60P 3/36 52/155 |
| 3,753,323 A * | 8/1973 | Nesbitt | ............... | B60P 3/32 52/155 |
| 3,775,917 A * | 12/1973 | Struben | ............... | E04B 1/34342 52/169.12 |
| 3,803,781 A * | 4/1974 | Struben | ............... | E04B 1/34342 52/312 |
| 3,827,201 A * | 8/1974 | Struben | ............... | E04B 1/34342 52/155 |
| 3,832,813 A * | 9/1974 | Hindman | ............... | E04B 1/34342 52/537 |
| 3,834,109 A * | 9/1974 | Lacona | ............... | E04B 1/34342 52/741.11 |
| 3,839,834 A * | 10/1974 | Goddard | ............... | E04B 2/74 52/63 |
| 3,866,381 A * | 2/1975 | Eschbach | ............... | B62D 33/046 52/262 |
| RE28,987 E * | 10/1976 | Lacona | ............... | E04B 1/34342 52/798.1 |
| 4,004,373 A * | 1/1977 | Eschbach | ............... | B62D 33/046 49/501 |
| 4,010,963 A * | 3/1977 | Prentice | ............... | E04B 1/34342 52/169.12 |
| 4,043,088 A * | 8/1977 | Payton | ............... | E04B 1/34342 52/529 |
| 4,051,633 A * | 10/1977 | Voegele, Jr. | ............... | E06B 3/4618 49/411 |
| 4,107,888 A * | 8/1978 | Krueger | ............... | E04B 1/34342 52/169.12 |
| 4,112,638 A * | 9/1978 | Hanson, Sr. | ............... | E04B 1/34342 52/165 |
| 4,159,844 A * | 7/1979 | Weiner | ............... | E04B 1/34342 52/169.12 |
| 4,214,412 A * | 7/1980 | Barylski | ............... | B60P 3/32 52/169.12 |
| D263,428 S | 3/1982 | Bartscher | | |
| D263,511 S | 3/1982 | Bartscher | | |
| 4,352,261 A * | 10/1982 | Wargo | ............... | E04B 1/34342 52/169.12 |
| 4,361,994 A * | 12/1982 | Carver | ............... | E06B 3/5821 D25/121 |
| 4,400,919 A * | 8/1983 | Szabo | ............... | E04B 1/34342 52/530 |
| 4,549,378 A * | 10/1985 | Ayers | ............... | E04B 1/34342 52/169.12 |
| 4,656,797 A * | 4/1987 | Marquart | ............... | E04B 1/0007 52/592.1 |
| 4,760,872 A * | 8/1988 | Hale, Jr. | ............... | E06B 7/32 160/90 |
| 4,805,361 A * | 2/1989 | Mason | ............... | E04B 1/34342 52/775 |
| 4,843,793 A * | 7/1989 | Ayers | ............... | E04B 1/34342 52/530 |
| D306,907 S | 3/1990 | Trezza | | |
| 5,090,168 A * | 2/1992 | Fast | ............... | E06B 1/26 52/204.5 |
| D329,296 S | 9/1992 | Albrecht | | |
| D342,579 S | 12/1993 | Mason | | |
| D355,494 S * | 2/1995 | Fenske | ............... | D25/138 |
| D361,630 S | 8/1995 | Guernsey | | |
| D375,574 S | 11/1996 | Pickett | | |
| 5,651,221 A * | 7/1997 | Golen | ............... | E06B 9/02 52/630 |
| 5,675,946 A * | 10/1997 | Verbeek | ............... | E05D 15/0643 52/64 |
| D395,713 S | 6/1998 | Schrotenboer | | |
| D397,457 S | 8/1998 | Hutchings | | |
| D402,063 S * | 12/1998 | Dickey | ............... | D25/138 |
| 5,907,933 A * | 6/1999 | Stanfill | ............... | E04B 1/34342 52/169.12 |
| 5,996,292 A * | 12/1999 | Hill | ............... | E06B 9/02 52/748.1 |
| D420,274 S | 2/2000 | Lappin et al. | | |
| 6,125,597 A * | 10/2000 | Hoffman | ............... | E04B 1/34352 52/293.3 |
| D437,427 S | 2/2001 | Shaffer | | |
| 6,189,264 B1 * | 2/2001 | DiVeroli | ............... | E06B 9/00 160/215 |
| D443,368 S | 6/2001 | Eaton | | |
| D452,334 S | 12/2001 | Gilbert et al. | | |
| D454,180 S | 3/2002 | Wessels | | |
| D472,333 S | 3/2003 | Shaw | | |
| 6,543,197 B2 * | 4/2003 | Wetzel, III | ............... | E04D 3/30 52/581 |
| D527,834 S | 9/2006 | Thimons et al. | | |
| 7,150,126 B2 * | 12/2006 | Rivera | ............... | B60J 5/06 49/63 |
| D538,948 S | 3/2007 | Thimons et al. | | |
| D568,060 S | 5/2008 | Munson | | |
| D577,835 S | 9/2008 | Raheel | | |
| D588,716 S | 3/2009 | Meyer | | |
| D600,543 S | 9/2009 | Coles | | |
| 7,681,362 B1 * | 3/2010 | Averitt | ............... | E04F 13/007 52/302.1 |
| 7,685,781 B1 * | 3/2010 | Hatch | ............... | E04B 1/34342 52/800.12 |
| D615,671 S | 5/2010 | Morren | | |
| 7,707,778 B2 * | 5/2010 | Petta | ............... | E06B 3/5409 49/404 |
| D621,530 S | 8/2010 | Sawyer | | |
| D624,212 S | 9/2010 | Sawyer | | |
| 8,074,408 B1 * | 12/2011 | Motosko | ............... | E06B 9/02 52/798.1 |
| D653,771 S | 2/2012 | Olmsted et al. | | |
| D656,251 S | 3/2012 | Underkofler et al. | | |
| D659,264 S | 5/2012 | Wennerholm | | |
| 8,388,043 B2 * | 3/2013 | Lahnala | ............... | B60J 1/1853 49/63 |
| D698,046 S | 1/2014 | Griffiths | | |
| D700,365 S | 2/2014 | Griffiths | | |
| D700,366 S | 2/2014 | Griffiths | | |
| 8,756,878 B1 * | 6/2014 | Powell | ............... | E04C 2/243 52/169.12 |
| D718,886 S | 12/2014 | Derreumaux et al. | | |
| D718,887 S | 12/2014 | Derreumaux et al. | | |
| D724,240 S | 3/2015 | Ross | | |
| D732,200 S | 6/2015 | Russell, Jr. | | |
| D732,701 S | 6/2015 | Griffiths | | |
| D735,364 S | 7/2015 | Moller et al. | | |
| D736,962 S | 8/2015 | Bodwell et al. | | |
| D750,278 S | 2/2016 | Bodwell et al. | | |
| D752,776 S | 3/2016 | O'Neal | | |
| D754,882 S | 4/2016 | Hatch et al. | | |
| D762,878 S | 8/2016 | Hatch et al. | | |
| D767,168 S | 9/2016 | Hatch et al. | | |
| D767,169 S | 9/2016 | Hatch et al. | | |
| D774,213 S | 12/2016 | Baldoni et al. | | |
| D778,465 S | 2/2017 | Zombek | | |
| D800,343 S | 10/2017 | Stanfill | | |
| D811,626 S | 2/2018 | Sparks | | |
| 10,072,411 B1 * | 9/2018 | Moran | ............... | E04B 2/7401 |
| D831,856 S | 10/2018 | Chan | | |
| D833,587 S | 11/2018 | Neumann | | |
| D849,969 S | 5/2019 | Kilian | | |
| D859,696 S | 9/2019 | Kilian | | |
| D861,195 S | 9/2019 | Wilkie et al. | | |
| D861,919 S | 10/2019 | Mannhardt | | |

(56) References Cited

U.S. PATENT DOCUMENTS

| | | |
|---|---|---|
| D863,604 S | 10/2019 | Sexton et al. |
| 10,844,592 B2 * | 11/2020 | Jimenez .............. E04B 1/34342 |
| 10,900,243 B2 | 1/2021 | Koethe |
| D914,915 S | 3/2021 | Jackson et al. |
| D915,628 S | 4/2021 | Place et al. |
| D921,935 S | 6/2021 | Lazzarini |
| D927,021 S | 8/2021 | Klees et al. |
| D942,787 S | 2/2022 | Rollins et al. |
| D943,120 S | 2/2022 | Sexton et al. |
| D946,785 S | 3/2022 | Griffith et al. |
| D949,442 S | 4/2022 | Ryan |
| D952,194 S | 5/2022 | Lazzarini |
| D955,001 S | 6/2022 | Reid |
| D956,268 S | 6/2022 | Langeveld |
| D961,118 S | 8/2022 | Langeveld et al. |
| D966,874 S | 10/2022 | Zhou |
| D973,234 S | 12/2022 | Zombek |
| D979,101 S | 2/2023 | Sexton et al. |
| D979,800 S | 2/2023 | Shaw et al. |
| D994,906 S | 8/2023 | Pare et al. |
| D998,189 S | 9/2023 | Shaw et al. |
| D998,826 S | 9/2023 | Sandler |
| D998,828 S | 9/2023 | Maisonneuve |
| D1,010,862 S | 1/2024 | Lukito |
| D1,012,324 S | 1/2024 | Lukito |
| D1,012,325 S | 1/2024 | Lukito |
| D1,018,902 S | 3/2024 | Gallien |
| D1,018,913 S | 3/2024 | Gandhe |
| D1,019,992 S | 3/2024 | Hickey |
| D1,021,151 S | 4/2024 | Sinawi |
| D1,021,155 S | 4/2024 | Gandhe |
| D1,022,257 S | 4/2024 | Baltz, Jr. |
| D1,023,342 S | 4/2024 | Milligan |
| D1,024,755 S | 4/2024 | Heindl |
| D1,025,402 S | 4/2024 | Su |
| D1,025,407 S | 4/2024 | Geiger |
| D1,028,287 S | 5/2024 | Guerrera |
| 12,012,747 B1 * | 6/2024 | Milligan .............. E04B 1/34342 |
| D1,033,683 S | 7/2024 | Skawska |
| D1,035,046 S | 7/2024 | Geiger |
| D1,036,758 S | 7/2024 | Klus |
| D1,037,498 S | 7/2024 | Miller |
| D1,038,448 S | 8/2024 | Tang |
| D1,040,302 S | 8/2024 | Crowell |
| D1,040,303 S | 8/2024 | Crowell |
| D1,042,887 S | 9/2024 | Bilge |
| D1,048,471 S | 10/2024 | Lepior |
| D1,051,431 S | 11/2024 | Schofield |
| D1,051,432 S | 11/2024 | Schofield |
| 2005/0098060 A1 * | 5/2005 | Bigda ................ E05D 15/1007 105/378 |
| 2006/0005442 A1 * | 1/2006 | Burrous .................... G09F 1/12 40/791 |
| 2007/0028529 A1 * | 2/2007 | Carter ................ E04B 1/34336 52/64 |
| 2009/0288352 A1 * | 11/2009 | Wenrick .................... E06B 9/02 52/202 |
| 2010/0107505 A1 * | 5/2010 | Schreiner ............ E05D 15/1047 49/413 |
| 2012/0102849 A1 | 5/2012 | Shugart |
| 2015/0218793 A1 * | 8/2015 | Stanfill ............... E04B 1/34342 52/169.12 |
| 2017/0129549 A1 * | 5/2017 | Polgrean ................ B62D 35/008 |
| 2018/0058063 A1 | 3/2018 | Delfino |
| 2020/0248443 A1 | 8/2020 | Bates et al. |
| 2020/0277778 A1 * | 9/2020 | Jimenez .............. E04B 1/34342 |
| 2021/0102382 A1 | 4/2021 | Shaw |
| 2022/0372758 A1 | 11/2022 | Frobosilo et al. |
| 2023/0349154 A1 | 11/2023 | Teitelbaum |
| 2025/0116106 A1 * | 4/2025 | Milligan .............. E04B 1/34342 |

* cited by examiner

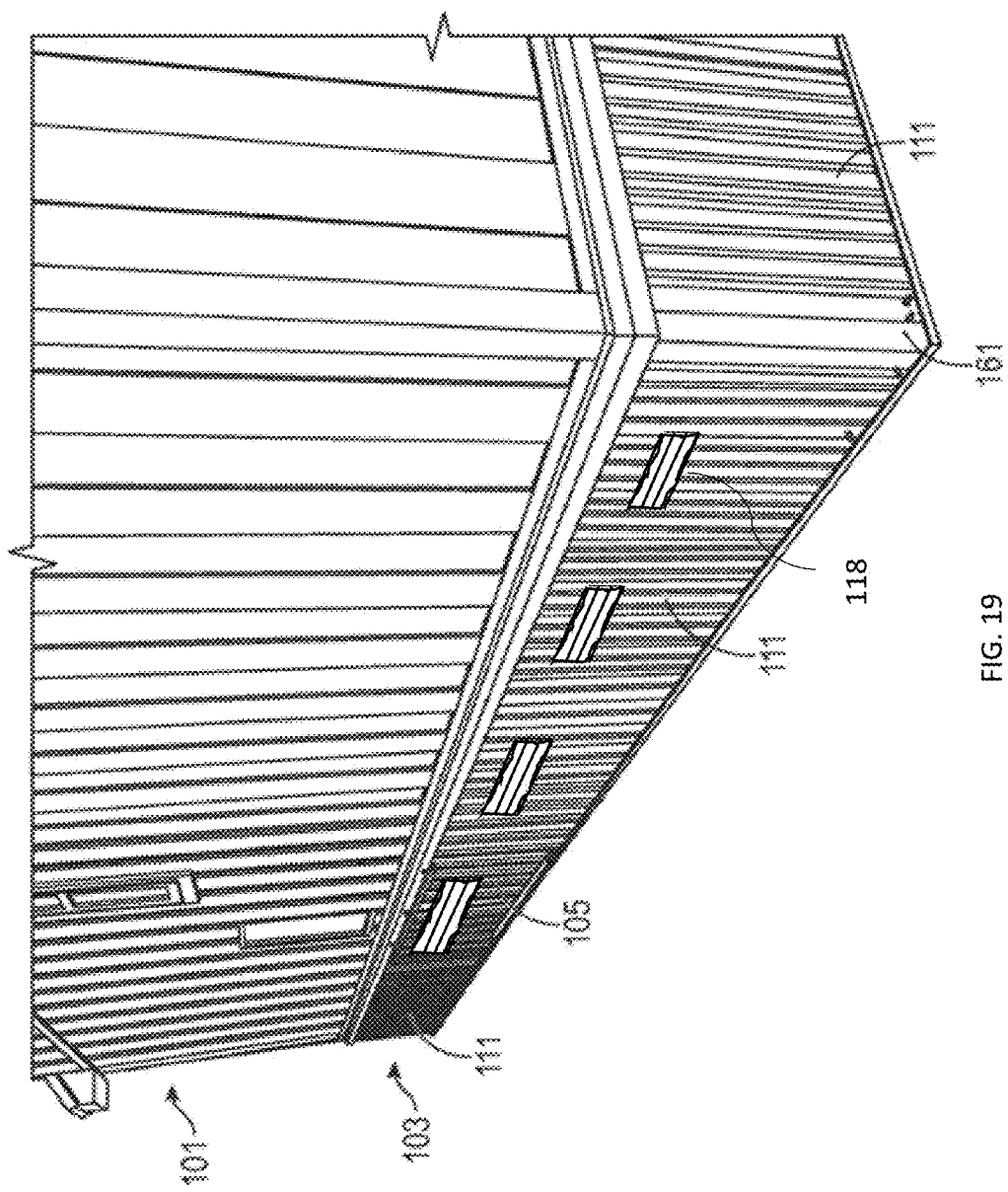

PERIMETER BARRIER FOR A BUILDING STRUCTURE

CROSS-REFERENCE TO RELATED APPLICATION

This application is a continuation-in-part of and claims priority to U.S. application Ser. No. 18/625,516, filed Apr. 3, 2024, which is a continuation of and claims the benefit of U.S. application Ser. No. 18/377,480, filed Oct. 6, 2023 and issued as U.S. Pat. No. 12,012,747 entitled "PERIMETER BARRIER FOR A BUILDING STRUCTURE," which is incorporated herein by reference in its entirety.

BACKGROUND

Field of the Disclosure

The present disclosure relates in general to mobile homes and, in particular, to a perimeter barrier around a bottom of a building structure.

Description of the Prior Art

Mobile homes typically are elevated on a frame or foundation by a few feet above the underlying surface or earth. This construction leaves the underside of the home, and the surface beneath it, exposed to the elements. Perimeter barriers can be installed around the bottom of the home to conceal and protect the space beneath it. Conventional perimeter barriers for mobile homes also are known as "skirting" or skirting systems. Although some conventional solutions are workable, improvements in skirting systems for buildings continue to be of interest.

SUMMARY

Embodiments described herein relate to a kit for a perimeter barrier for a building. The kit includes a panel, a j-track configured to be coupled to a bottom of the panel, a top track coupled to the building such that the top track is secured to an upper portion of the panel, a top h-track configured to be coupled to the panel and the top track, and a bottom h-track configured to be mounted to the panel and the j-track.

In other embodiments, a kit for a perimeter barrier for a building is disclosed. The kit includes a ventilated panel, a top trim back having an upper end configured to be mounted to the building an upper slot on a front face thereof, a top trim front including an upper portion snapped into the upper slot of the top trim back to secure an upper portion of the ventilated panel between the top trim back and the top trim front, and a j-track configured to receive and secure a bottom of the ventilated panel.

In yet another embodiment, a kit for a perimeter barrier for a building is disclosed. The kit includes a panel, a top trim back having an upper end configured to be mounted to the building an upper slot on a front face thereof, a top trim front having an upper portion snapped into the upper slot of the top trim back to secure an upper portion of the panel between the top trim back and the top trim front, a j-track configured to receive and secure a bottom of the panel, and an insulated panel configured to be installed behind the panel.

BRIEF DESCRIPTION OF THE DRAWINGS

Before one or more embodiments are described in detail, one skilled in the art will appreciate that they are not limited in its application to the details of construction, the arrangements of components, and the arrangement of steps set forth in the following detailed description or illustrated in the drawings and descriptions. Rather, they are capable of other embodiments and of being practiced or being carried out in various ways. Also, it is to be understood that the phraseology and terminology used herein is for the purpose of description and should not be regarded as limiting.

FIG. 19 is an isometric view of a skirting including an insulated panel mounted to a home, according to one or more embodiments shown and described herein;

DETAILED DESCRIPTION

Referring to FIGS. 1-18, the following descriptions of various implementations of the present teachings have been presented for purposes of illustration and description. It is not exhaustive and does not limit the present teachings to the precise form disclosed. Modifications and variations are possible in light of the above teachings or may be acquired from practicing the present teachings.

Figure 1:
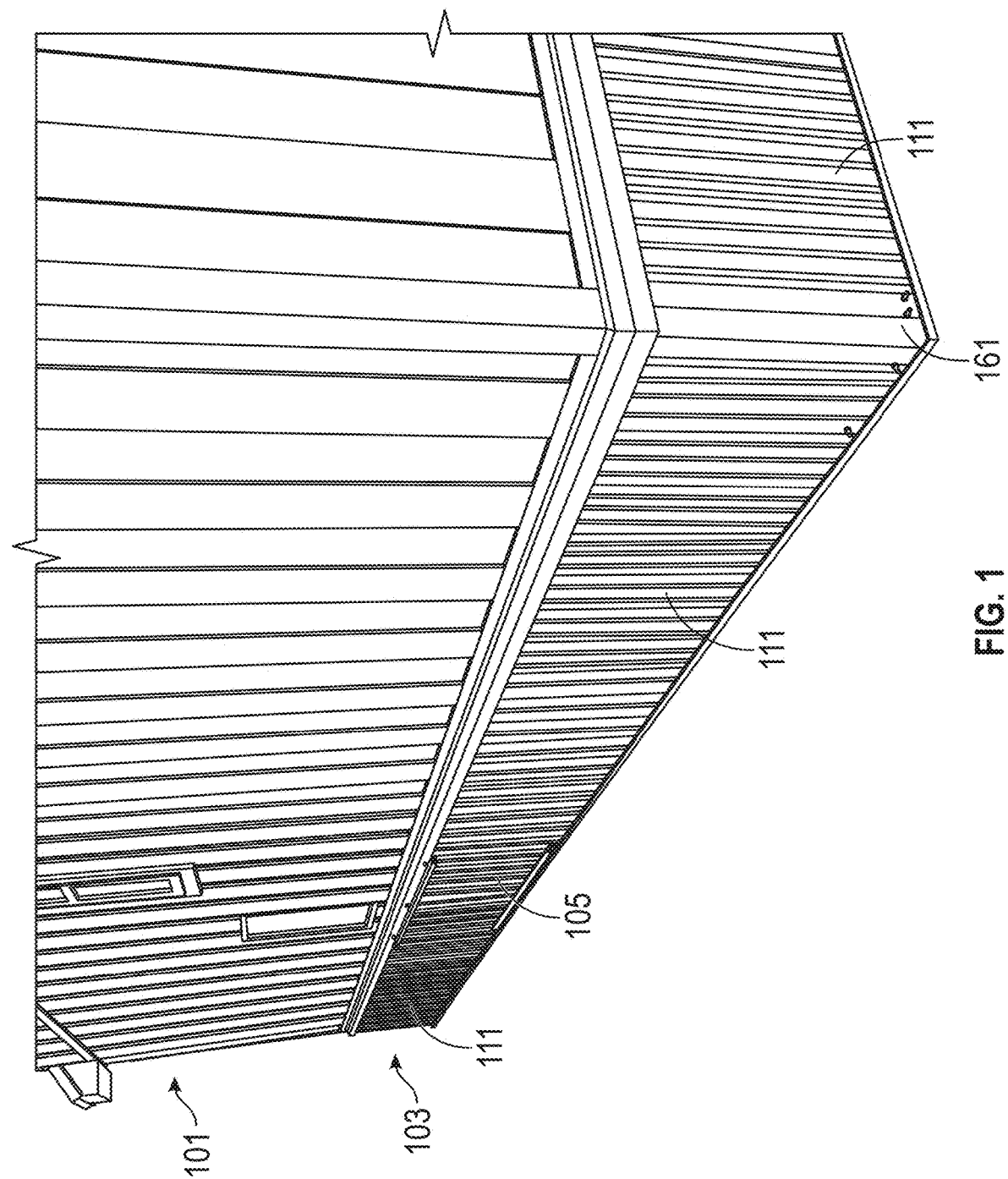
FIG. 1 is an isometric view of an embodiment of a skirting mounted to a home, according to one or more embodiments shown and described herein.
Figure 2:
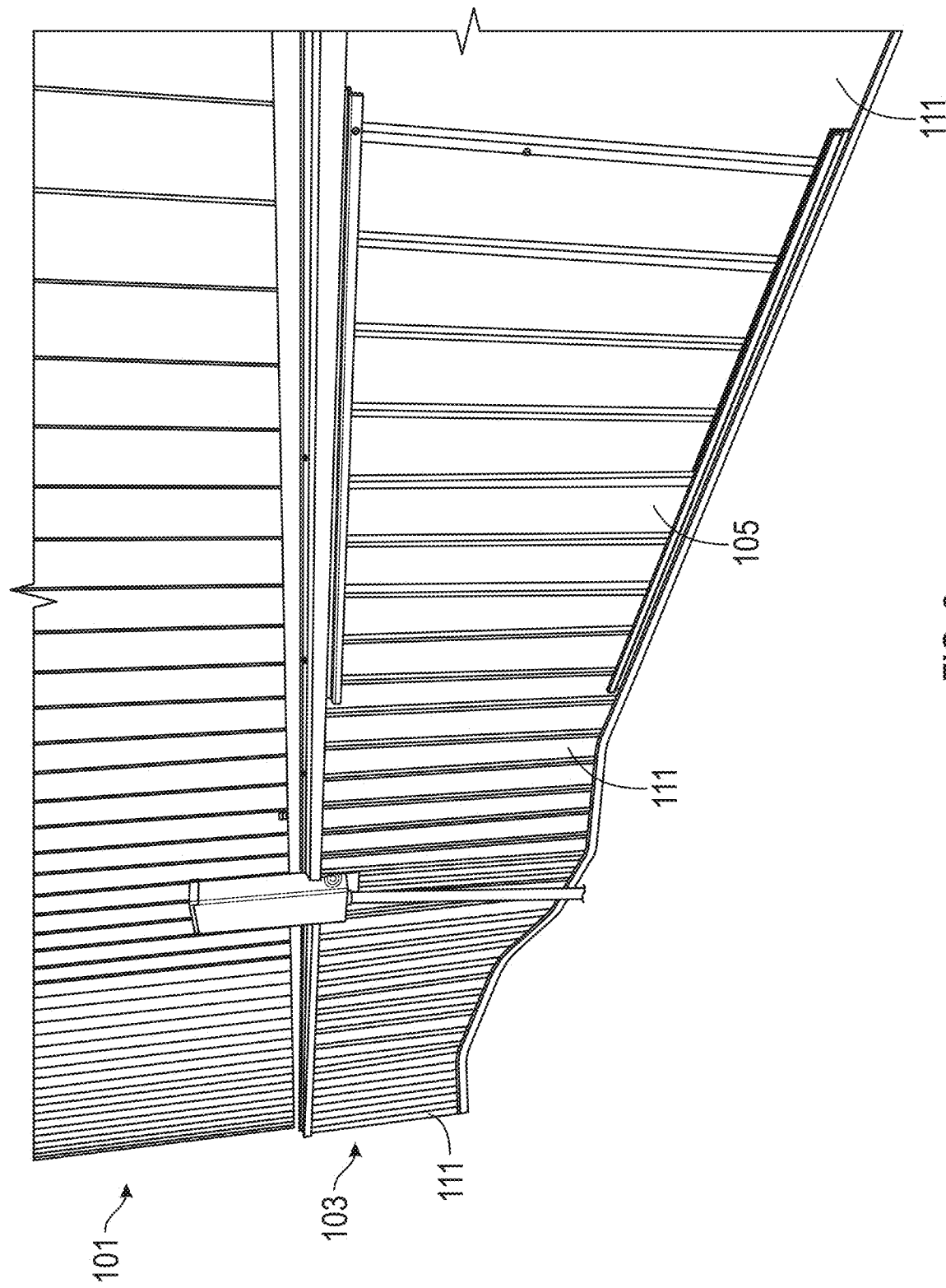
FIG. 2 is another isometric view of the skirting and home of FIG. 1, according to one or more embodiments shown and described herein.
Figure 3:
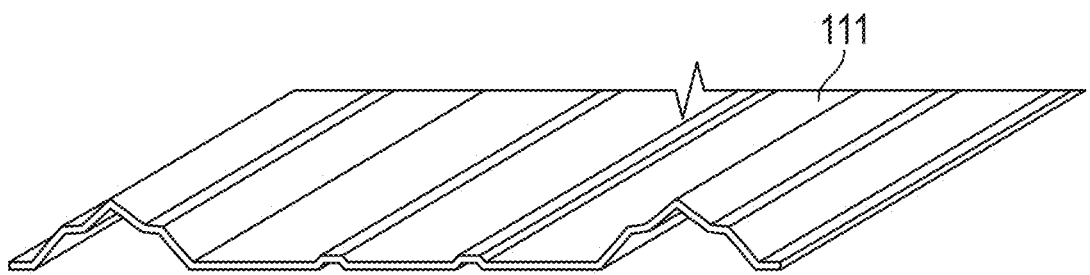
FIG. 3 is an isometric view of an embodiment of a panel, according to one or more embodiments shown and described herein.
Figure 4:
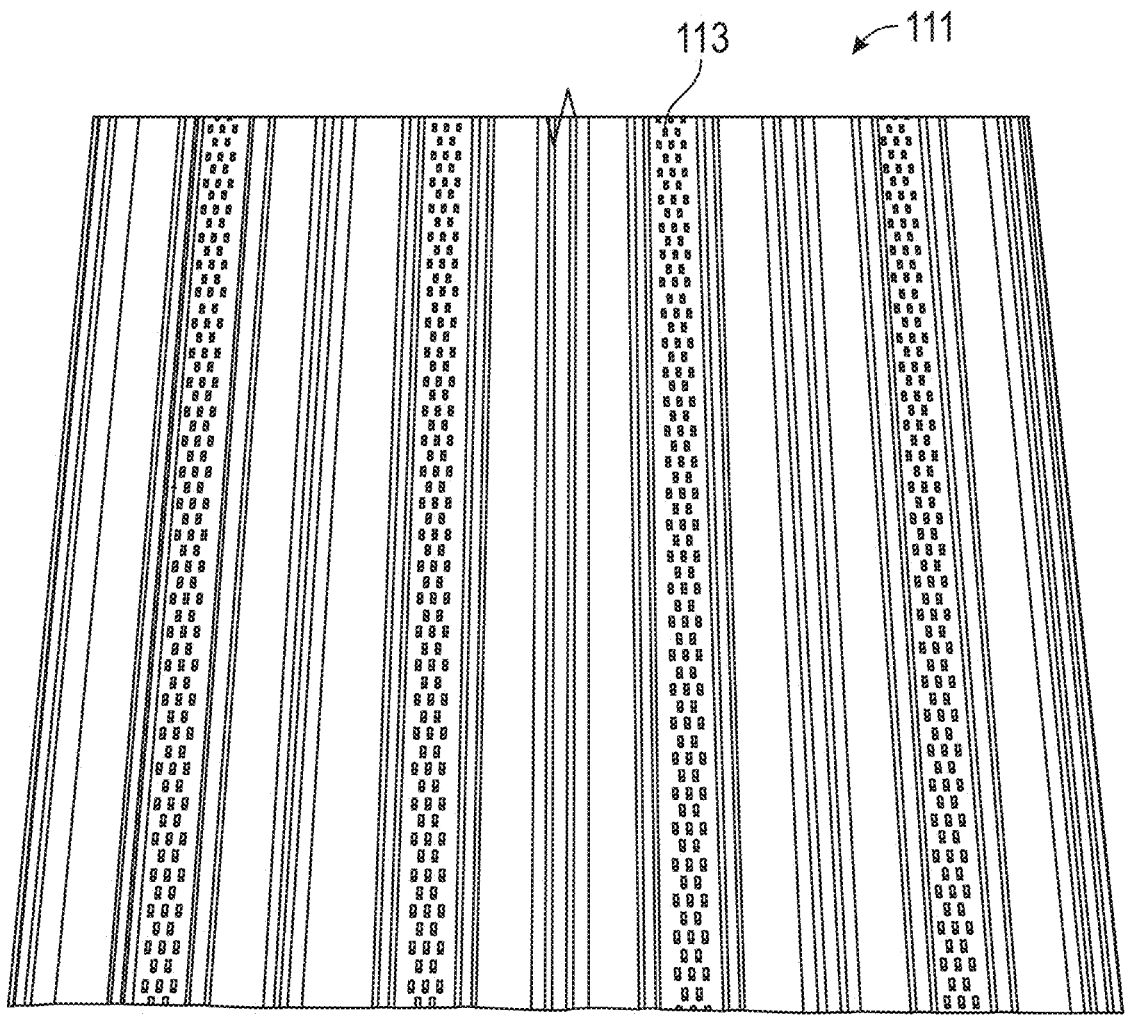
FIG. 4 is an isometric view of another embodiment of a panel, according to one or more embodiments shown and described herein.
Figure 5:
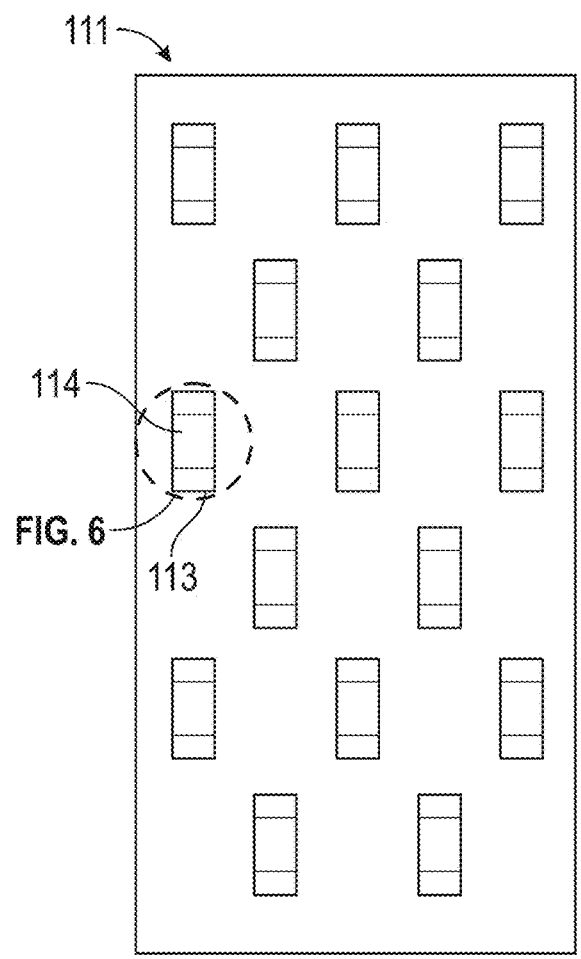
FIG. 5 is an enlarged front view of an embodiment of a portion of a panel, according to one or more embodiments shown and described herein.

Embodiments of a system, method and apparatus for a perimeter barrier for a building structure are disclosed. For example, FIGS. 1 and 2 depict a mobile home or home 101 having skirting 103. Embodiments of the skirting 103 may comprise a variety of components that are assembled together and to the home 101 with fasteners, such as screws. The skirting 103 can extend partially or completely around the bottom perimeter of the home 101 down to the underlying ground to form a barrier. Access through the skirting 103 to the space beneath the home 101 may be provided via a slidable door 105 that is movable in tracks, as will be described below.

Figure 6:
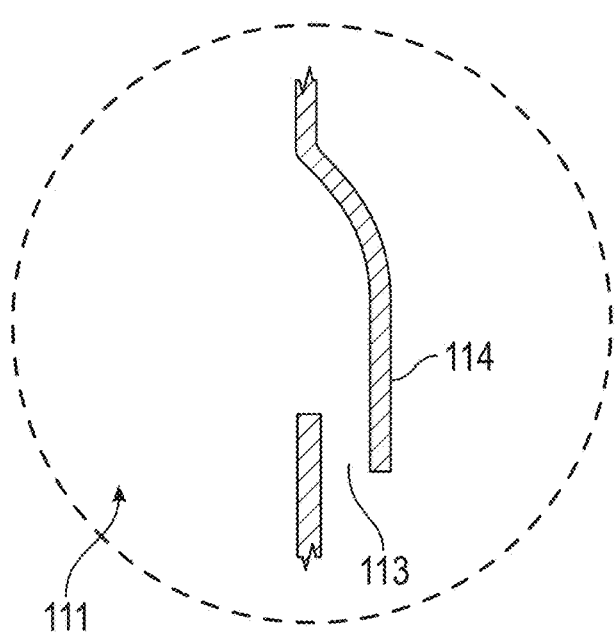
FIG. 6 is an enlarged sectional side view of a portion of the panel of FIG. 5, according to one or more embodiments shown and described herein.

In some versions, the primary component of the skirting 103 is a panel 111. Features of the panels 111 are shown in FIGS. 3-6. The panels 111 can be numerous and comprise most of the structure of the skirting 103. The panels 111 can be thin and rectangular in shape, and comprise a metal, such as aluminum, or a polymer like vinyl. The panels 111 can be corrugated for strength and rigidity, and also can be ventilated or perforated with apertures 113. In FIG. 6, note how the panel 111 can be partially punched, such that the punched portion 114 partially or completely cover the aperture 113 to provide enhanced weather protection. When formed from metal, the panels 111 also can be fire-proof as well as weed trimmer-proof.

Figure 7:
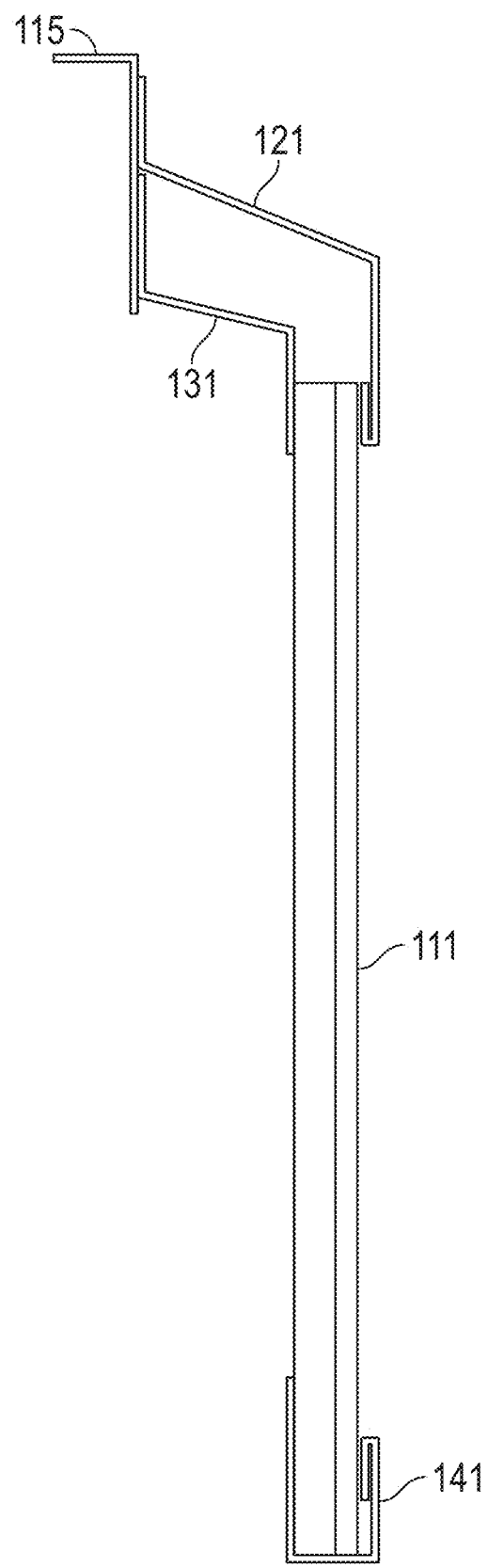
FIG. 7 is a sectional side view of an embodiment of a skirting, according to one or more embodiments shown and described herein.
Figure 8:
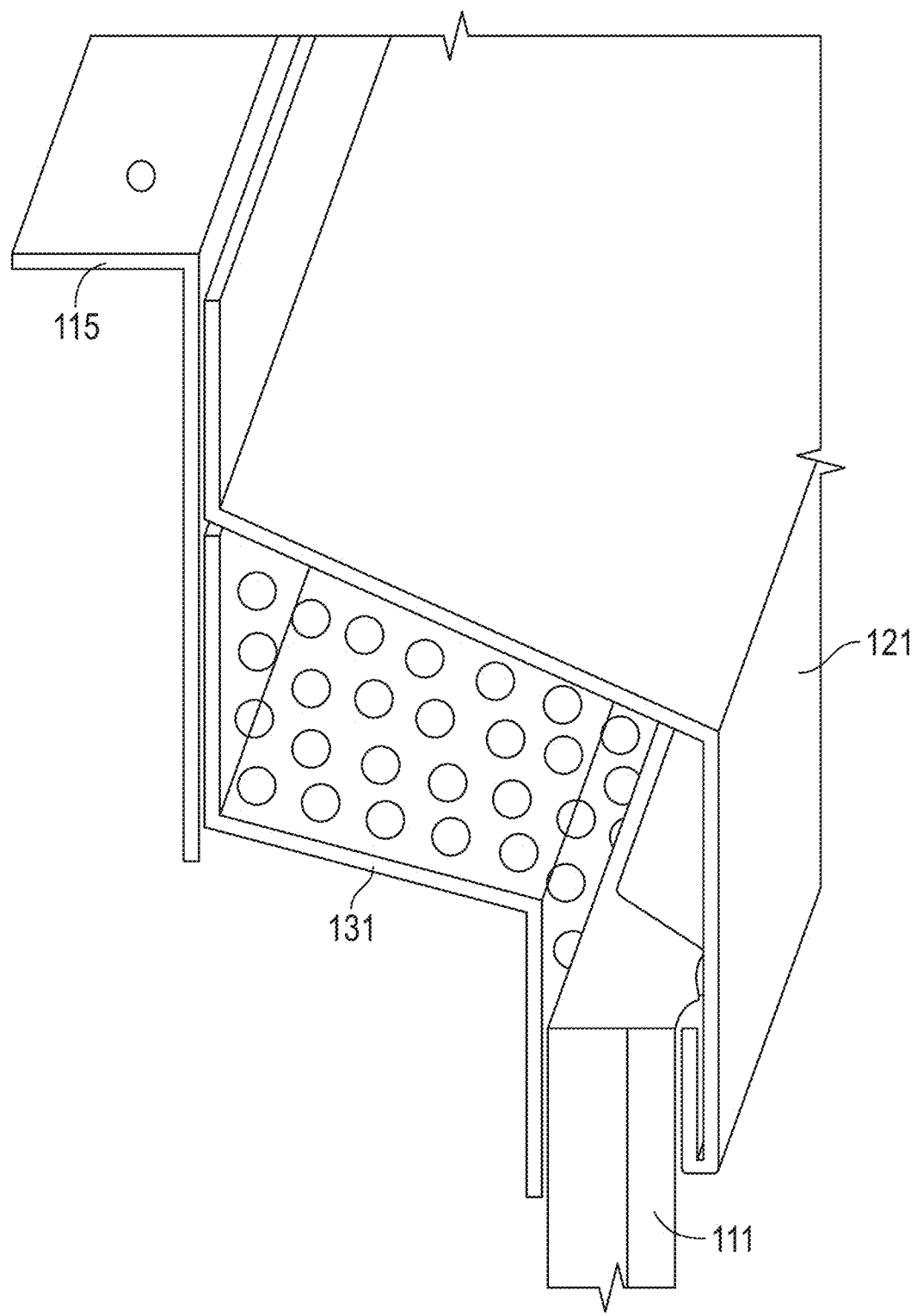
FIG. 8 is an enlarged isometric view of an upper portion of the skirting of FIG. 7, according to one or more embodiments shown and described herein.
Figure 9:
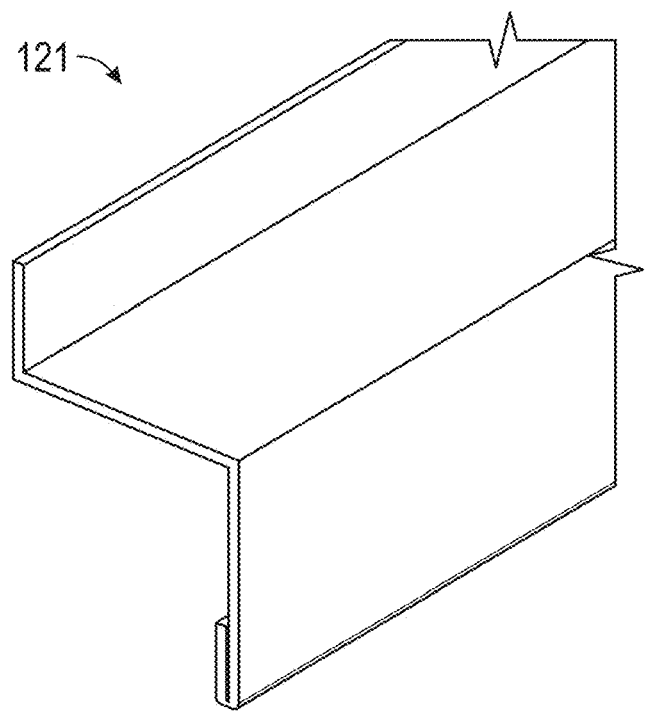
FIGS. 9-11 are isometric view of embodiments of a top track, z-vent and j-track, respectively, according to one or more embodiments shown and described herein.
Figure 10:
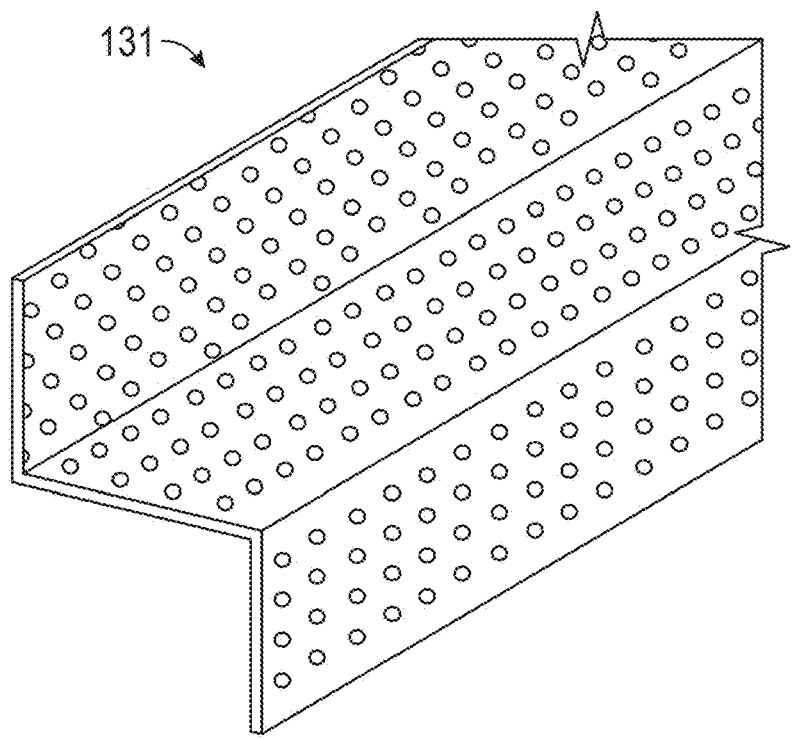
Figure 11:
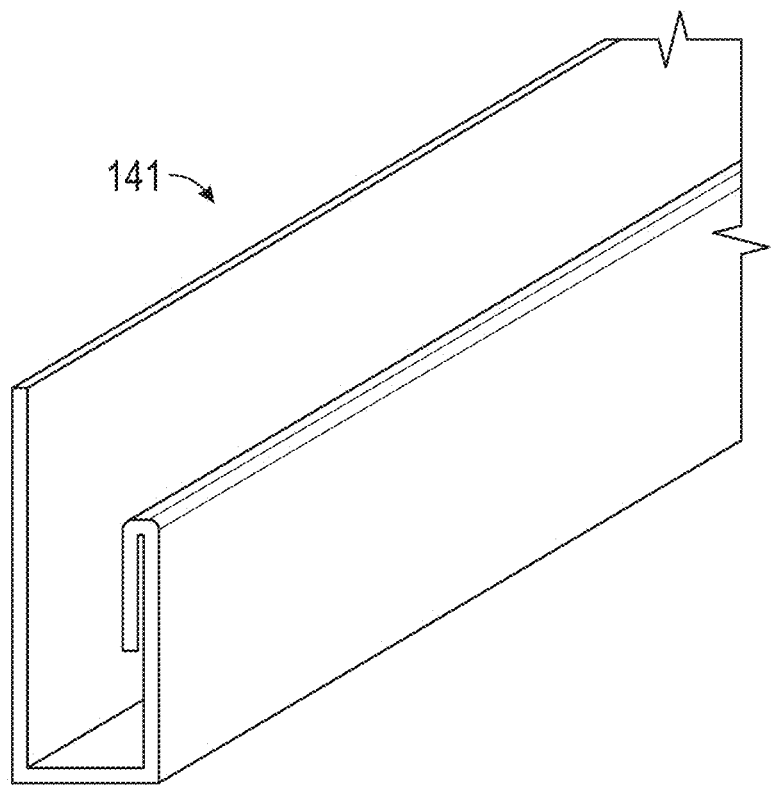

As shown in FIGS. 7 and 8, embodiments of each panel 111 can be installed in the skirting 103 with other components. For example, upper edges of the panel 111 can be secured to the home 101 with an optional bracket 115 (when needed) via a top track 121 (also shown in FIG. 9) and a z-vent 131. The top track 121 is either directly secured to the home 101 or to the optional bracket 115, as is the z-vent 131 (also shown in FIG. 10), which is known as an expansion joint that can be ventilated. For example, in these embodiments, the top track 121 and/or the z-vent 131 may be formed of a flexible material (e.g., rubber, metal, elastomer, etc.) that may allow the top track 121 and/or z-vent 131 to deform (e.g., move) in various directions (e.g., longitudinal, lateral, angular, etc.) while remaining secured to the home 101. Furthermore, it should be appreciated that, in the embodiments described herein, the flexible nature of the top track 121 and/or the z-vent 131 may absorb forces resulting from expansion and/or contraction of the panel 111 while maintaining the functionality and structural integrity of the skirting 103.

The panel 111 can be secured to the z-vent 131 with fasteners, such as screws. The lower edges of the panel 111 can be mounted in and secured in a j-track 141 (see FIG. 11). Each of these components can be made to any desired dimensions, such as length, width, height and thickness of material.

Figure 12:
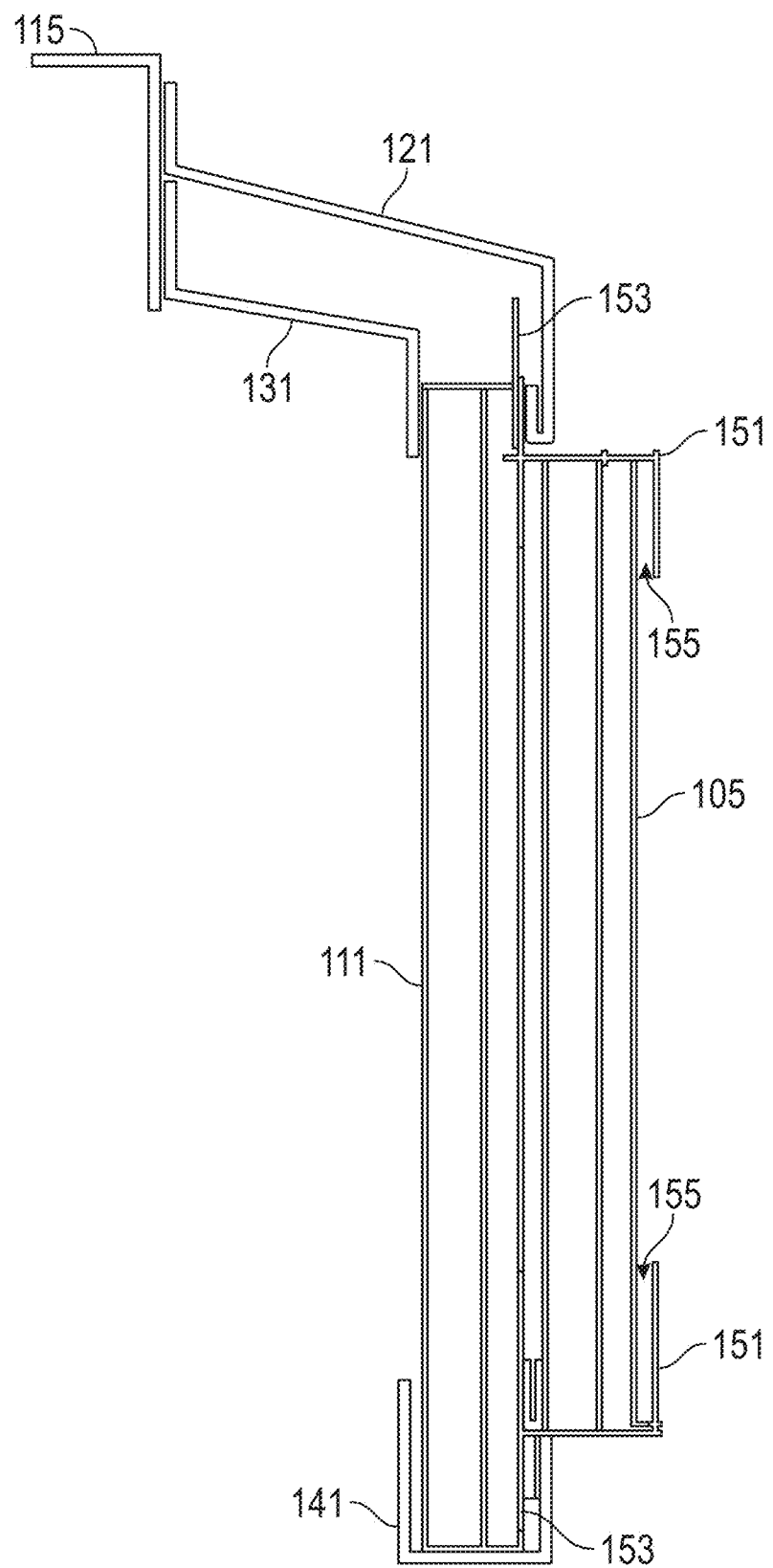
FIG. 12 is a sectional side view of another embodiment of a skirting, according to one or more embodiments shown and described herein.
Figure 13:
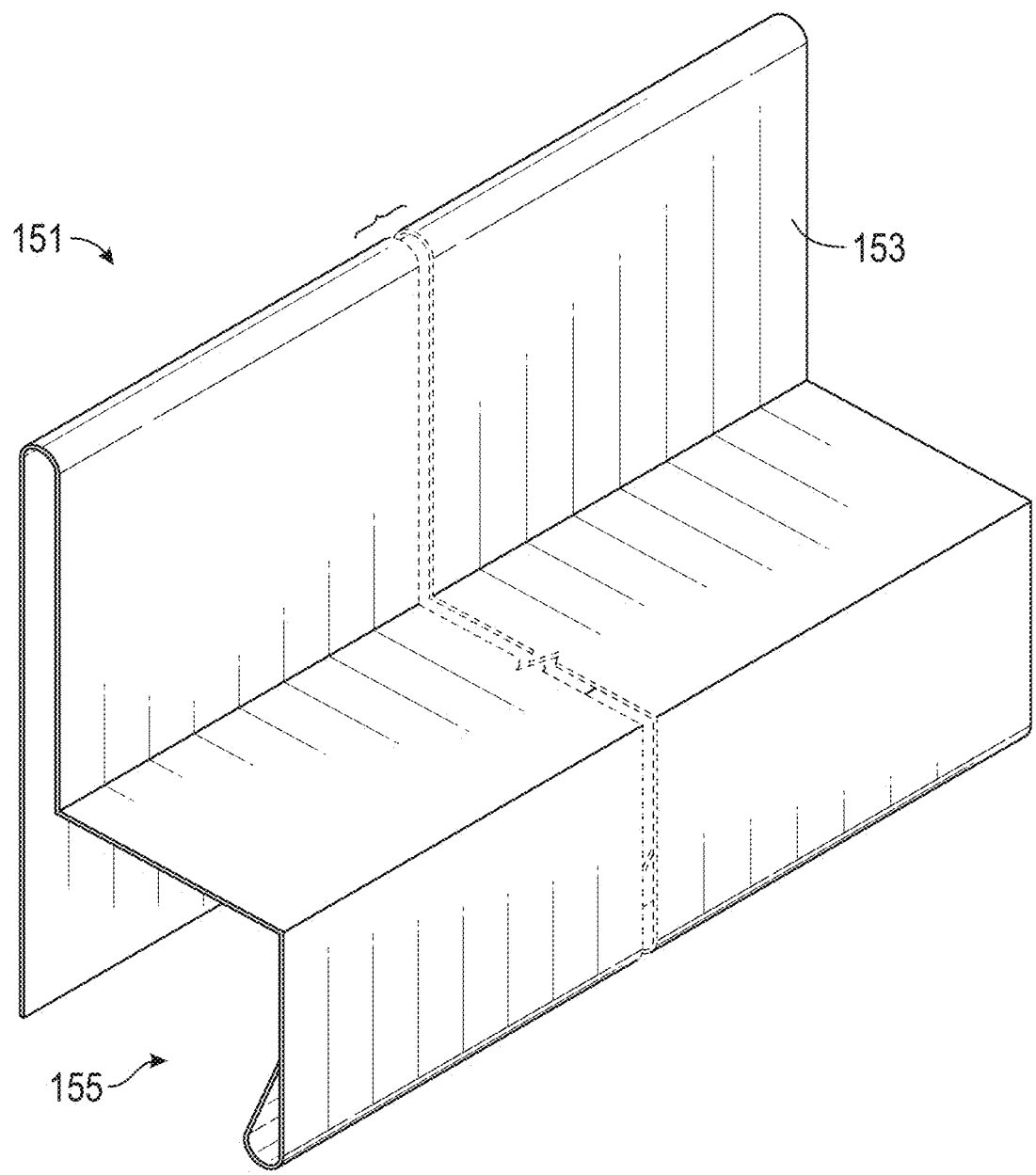
FIG. 13 is an isometric view of an embodiment of an h-track, according to one or more embodiments shown and described herein.

As previously discussed in FIGS. 1 and 2, the skirting 103 can be provided with a door 105. In some embodiments, the door 105 can be mounted in the system as shown in FIG. 12.

In addition to the previously described components, an h-track 151 (also shown in FIG. 13) can be mounted at both the top and the bottom of the system. For example, one h-track 151 can be located at the top of the system by securing its flange 153 between a top of a panel 111 and a bottom of a top track 121. Another h-track 151 can be inverted and located at the bottom of the system by securing its flange 153 between the bottom of the panel 111 and the j-track 141. The two h-tracks 151 have slots 155 that can extend toward each other to define a narrow rectangular space, for example, in which the door 105 can be slidably mounted (e.g., to the left or to the right) to provide access through the skirting 103.

Alternatively, the upper h-track 151 may be provided with a deeper slot 155 that the bottom h-track 151. In this version, the deeper slot 155 enables the door 105 to be lifted vertically into the deeper slot 155 (rather than sliding left or right), such that the bottom of the door 105 may be removed from the j-track 141 toward the user, and then removed completely from the assembly.

Figure 14:
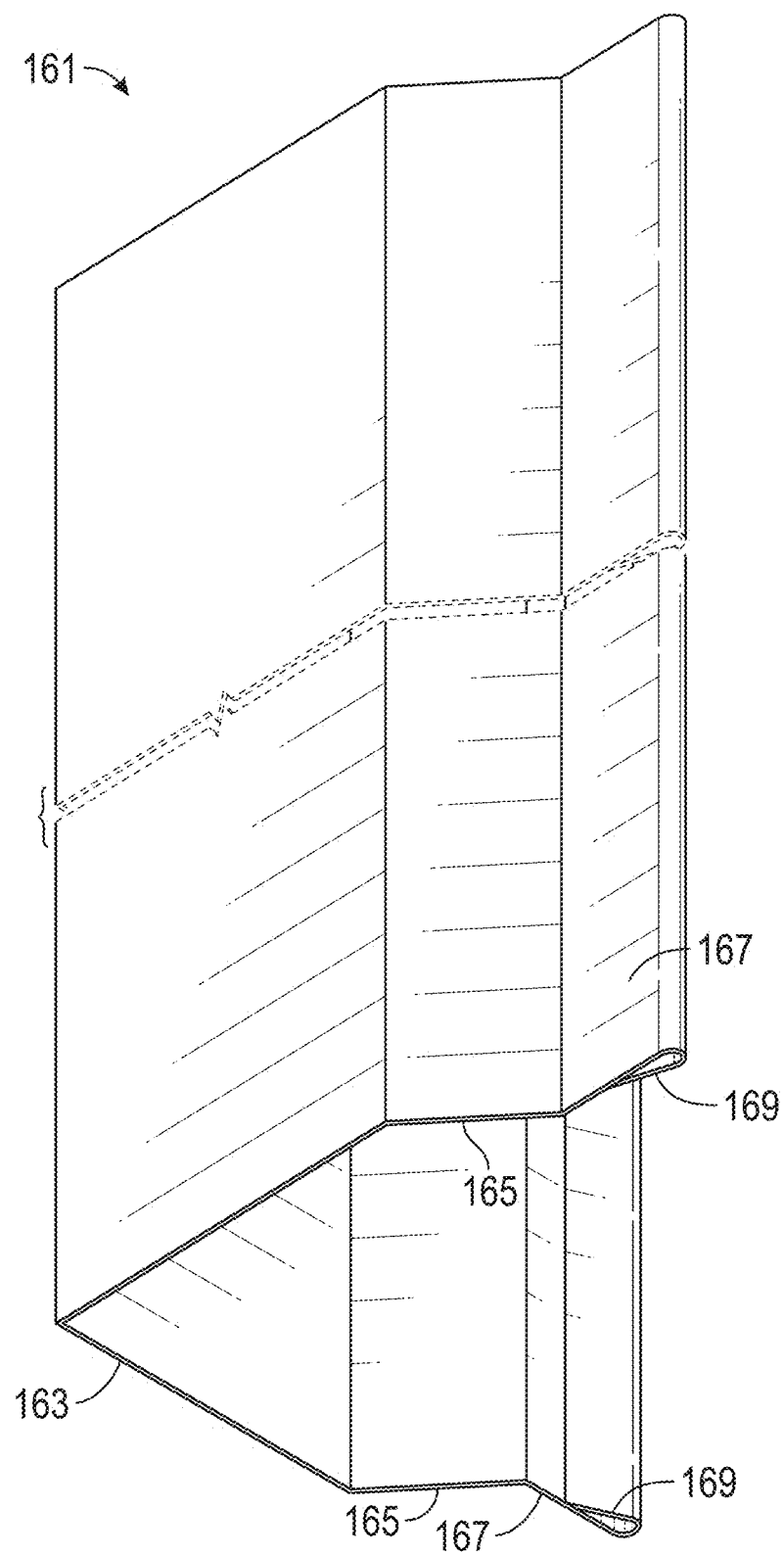
FIG. 14 is an isometric view of an embodiment of a corner, according to one or more embodiments shown and described herein.
Figure 15:
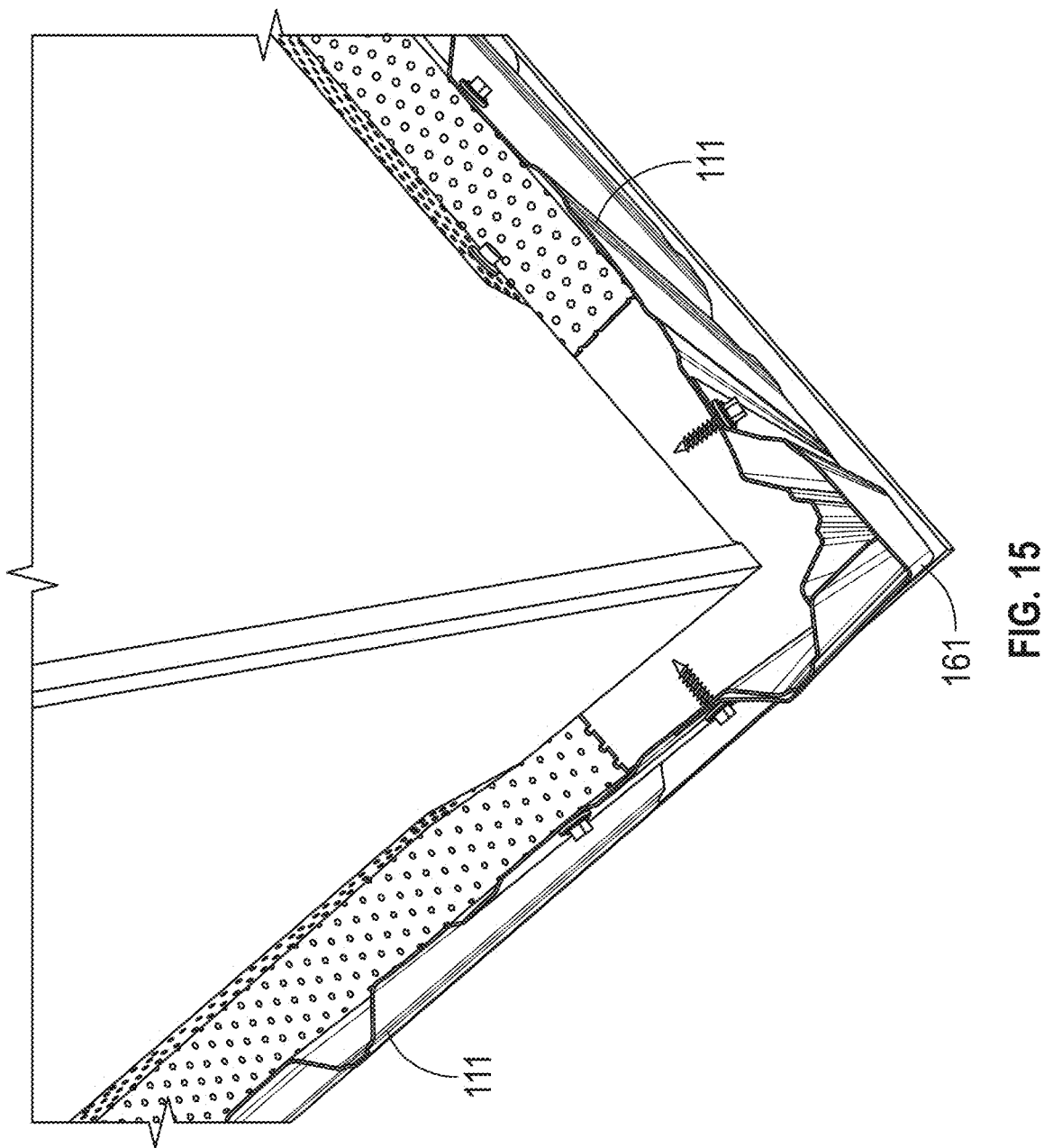
FIG. 15 is a top view of an embodiment of a corner installed on a home, according to one or more embodiments shown and described herein.

As shown in FIGS. 1, 14 and 15, embodiments of the skirting 103 also may comprise corners 161 at each corner intersection of the skirting 103. Each corner 161 may comprise a perpendicular section 163 from each side of which extends a wall 165 at a 135 degree angle with respect to the perpendicular section 163, for example. In some versions, a mounting flange 167 may extend from each wall 165 and be oriented at a 135 angle with respect to the respective wall 165. Thus, the mounting flanges 167 can be parallel to the respective sides of the perpendicular section 163. Each mounting flange 167 can comprise a rounded edge 169, which also is known as a hem, to prevent scratching of panels 111.

Figure 16:
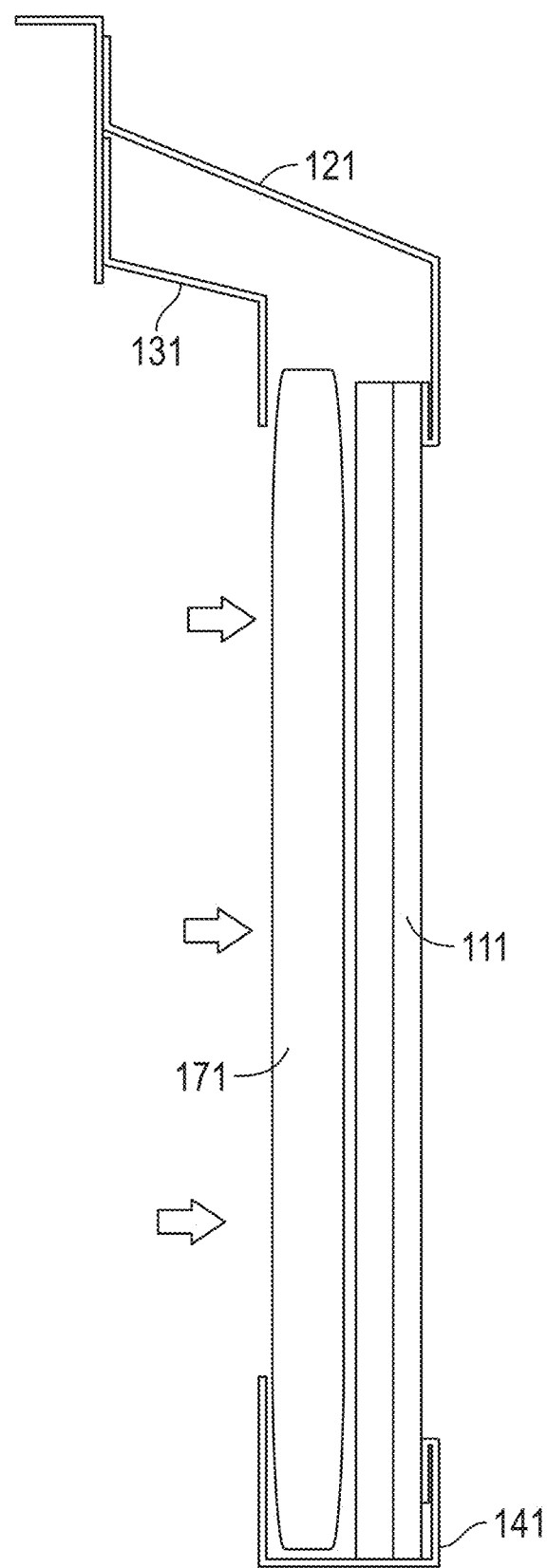
FIG. 16 is a sectional side view of still another embodiment of a skirting, according to one or more embodiments shown and described herein.
Figure 17:
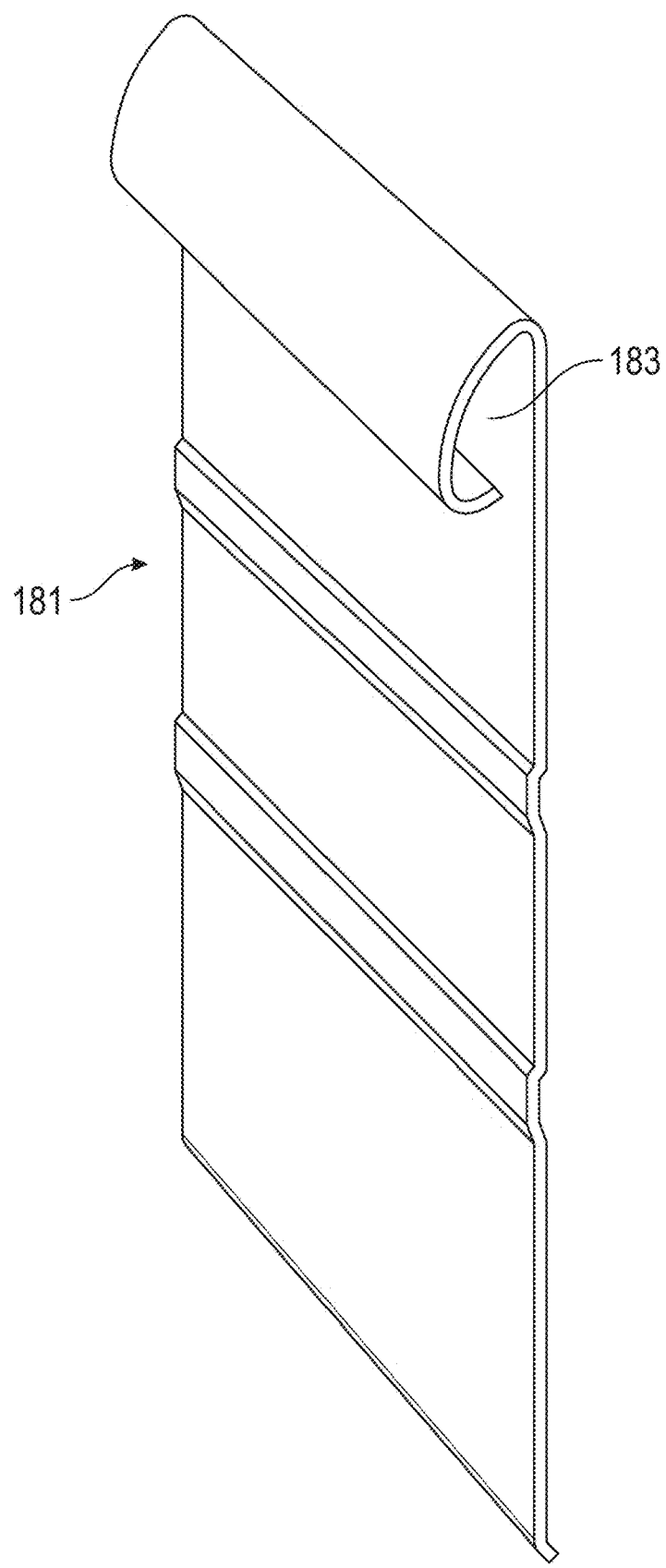
FIG. 17 is an isometric view of an embodiment of a top trim back for a kit, according to one or more embodiments shown and described herein.
Figure 18:
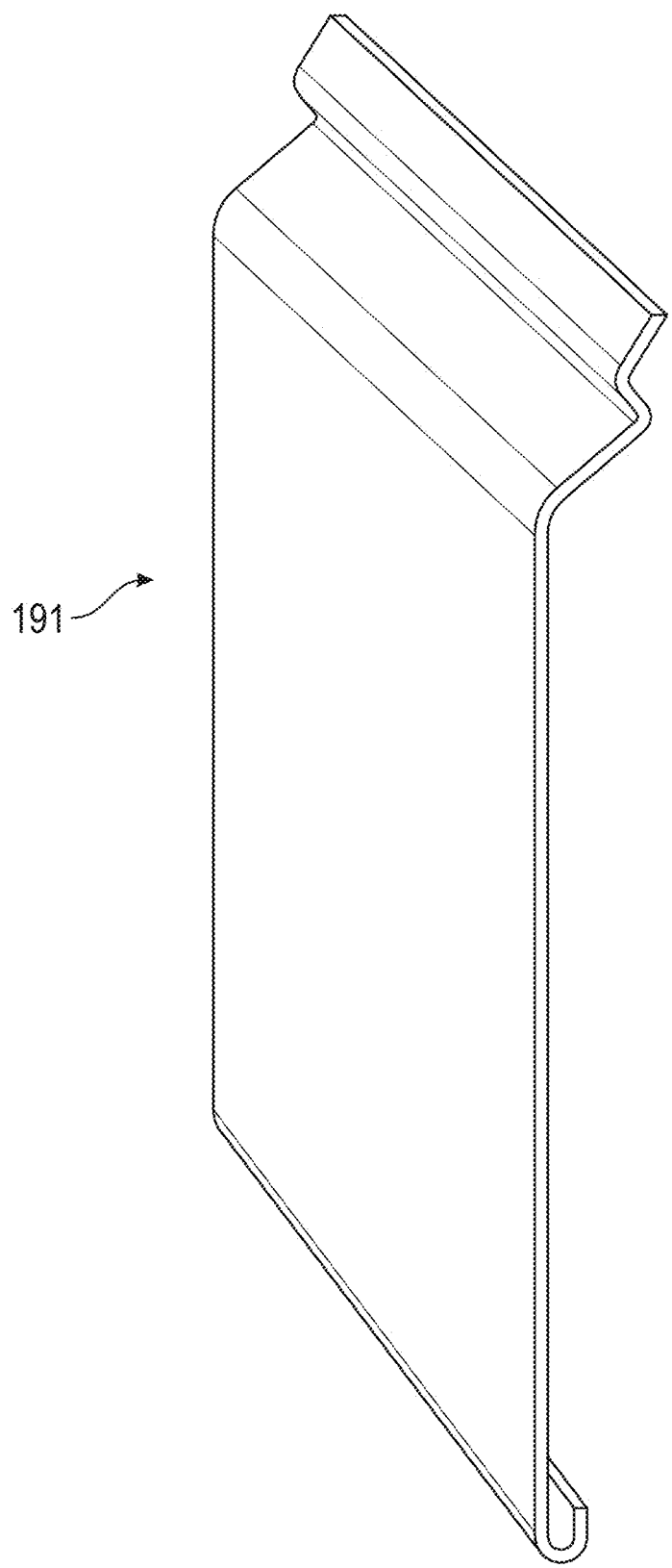
FIG. 18 is an isometric view of an embodiment of a top trim front for a kit, according to one or more embodiments shown and described herein.
Figure 21:
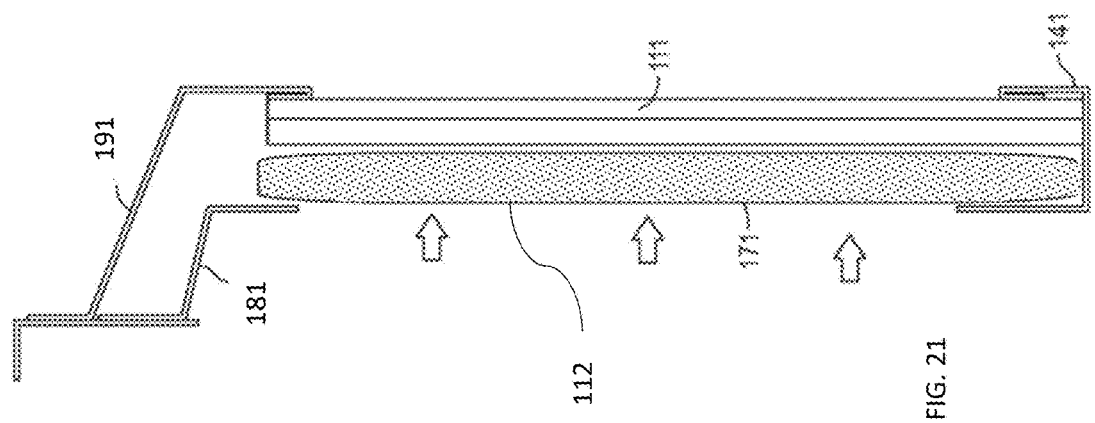
FIG. 21 is a section side view of another embodiment of the skirting and insulated panel of FIG. 19, according to one or more embodiments shown and described herein.
Figure 20:
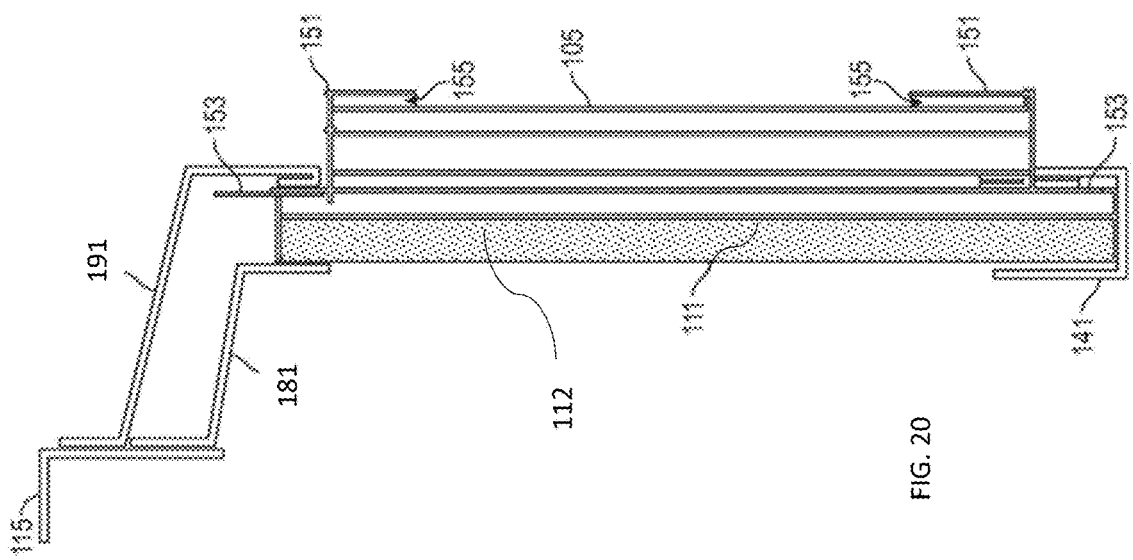
FIG. 20 is a sectional side view of the skirting and insulated panel of FIG. 19, according to one or more embodiments shown and described herein.
Figure 22:
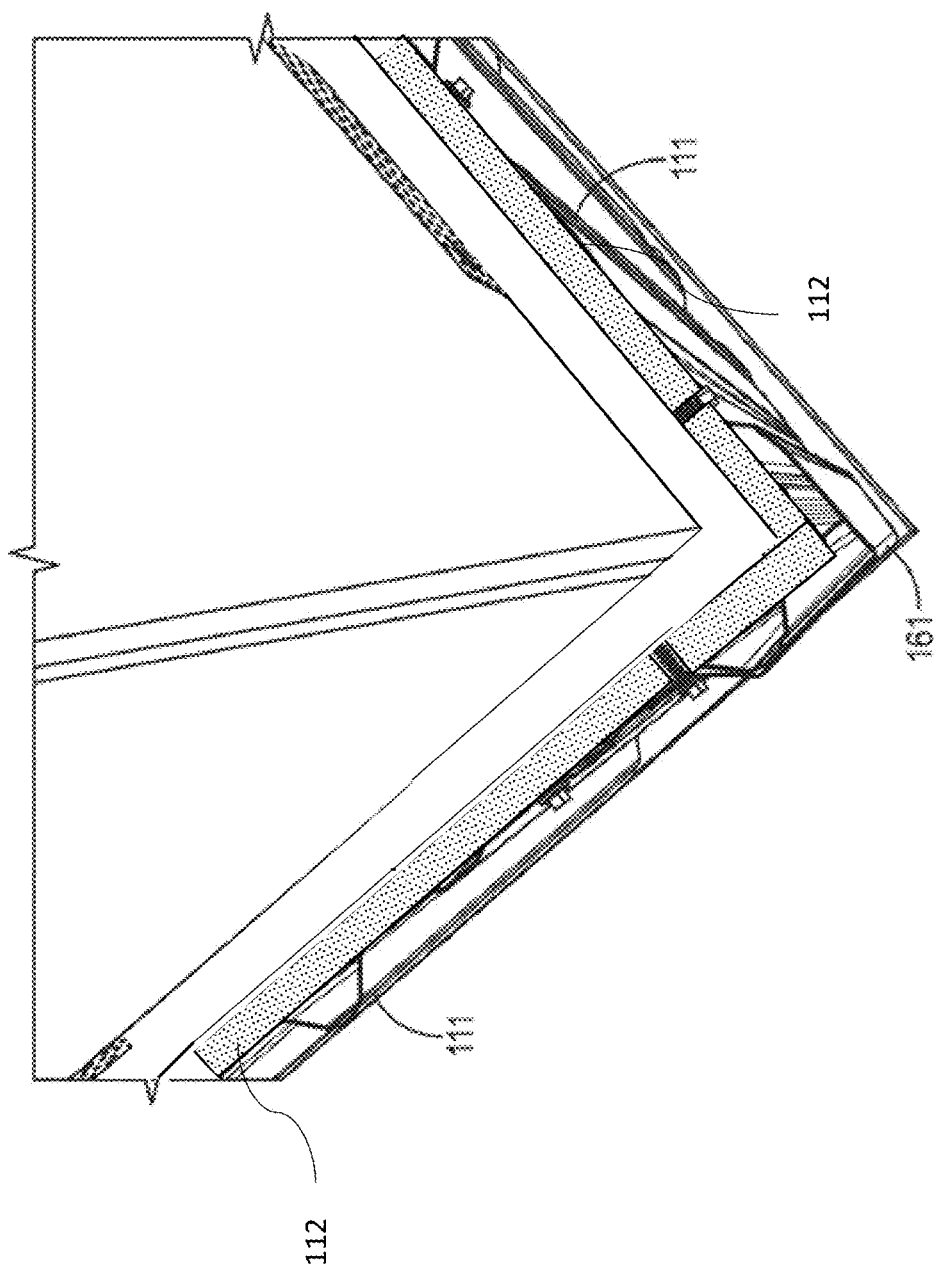
FIG. 22 is a top view of an embodiment of a corner of the skirting of FIG. 19 installed on a home, according to one or more embodiments shown and described herein.

FIG. 16 depicts an embodiment of the skirting 103 with an insulation panel 171. In this version, the insulation panel 171 can be installed behind the panel 111 (on an interior of the skirting 103) between the top track 121 and z-vent 131 with fasteners at the top of the assembly, and in the j-track 141 at the bottom of the assembly, optionally with fasteners. The insulation panel 171 can be formed from foam board or other materials.

In another embodiment, the skirting 103 can be sold as a "kit" of components that, when assembled together, can form a portion of the skirting 103. A consumer may then purchase as many "kits" as are needed to complete their particular length of skirting 103 for their home 101. For example, each of the following components may be provided in, e.g., twelve-foot lengths: a ventilated panel 111, a top trim back 181 (FIG. 17), a top trim front 191 (FIG. 18) and a j-track 141. In these versions, some of the other components previously described are not used in the system. Rather, an upper end of the top trim back 181 is fastened to the home 101, a bottom of the panel 111 is placed in the j-track 141, and an upper portion of the top trim front 191 is snapped into place in an upper slot 183 on the front face of the top trim back 181 to secure the upper end of the panel 111 in place therebetween.

For example, in some embodiments, the kit may include the panel 111, the j-track 141 coupled to the bottom of the panel 11, the top track 121 coupled to the building such that the top track 121 is secured to an upper portion 114 of the panel 111, an h-track 141 coupled to the panel 111 and the top track 121 (FIGS. 2, 7, and 8). In other embodiments, the kit may include the ventilated panel 111, the top trim back 181, the top trim front 191, and the j-track 141. (FIGS. 4, 12, 17, and 18).

In other embodiments still, such as those depicted in FIGS. 19-22, the kit may include the panel 111, top trim back 181 (including an upper end mounted to the building), the top trim front 191, the j-track 141, and an insulated panel 112. In these embodiments, the insulated panel 112 may be installed behind the panel 111, and may be configured to reduce heat transfer through the skirting 103. For example, it should be appreciated that the insulated panel 112 may provide a thermal barrier between an external environment and the underside of the home 101, which may help to maintain a desired temperature inside the home 101. Furthermore, the insulated panel 112 may also act as a sound barrier capable of reducing noise infiltration within the home 101.

In these embodiments, an upper edge of the insulated panel 112 may be fastened (e.g., fixedly or releasably) to the top trim 181 or directly to the home 101 itself. For example, the insulated panel 112 may be fixed to the top trim 181 or the home 101 by way of a fastener (e.g., screw, clip, bracket, etc.).

Referring still to FIGS. 19-22, with the upper edge of the insulated panel 112 fastened to the top trim 181 or to the home 101, the bottom edge of the insulated panel 112 may be inserted into the j-track 141. It should be appreciated that, in some embodiments described herein, additional security mechanisms may be utilized to secure the insulated panel 112 behind the panel 111, such as adhesive strips, lateral brackets, or other similar security mechanisms configured to ensure that the insulated panel 112 remains secured behind the panel 111. Furthermore, in these embodiments, the insulated panel 112 may have a panel width, such that the insulated panel 112 is configured to be fastened to the top trim 181 and/or received within the j-track 141, as described in detail herein. For example, in the embodiments described herein, the insulated panel 112 may have a panel width of less than or equal to 0.75 inches, less than or equal to 0.5, inches, or any other similar panel width, such that the insulated panel 112 may be received within the j-track 141 while maintaining desired insulation properties.

In the embodiments described herein, it should be appreciated that the insulated panel 112 may be formed of foam board insulation, reflective insulation, fiberglass insulation, wool and/or mineral insulation, or any combination thereof without departing from the scope of the present disclosure. Furthermore, it should be understood that the material used for the insulated panel 112 may be determined based on ventilation, environmental, and/or other similar considerations.

Referring again to FIGS. 19-22, and as illustrated most clearly in FIG. 19, the panel 111 and/or insulated panel 112 may include a plurality of vents 118. In these embodiments, the plurality of vents 118 may be configured to prevent moisture buildup beneath the home 101, and may also aid in regulating temperature underneath the home 101.

In some embodiments, the plurality of vents 118 may be manually translated between an open position (e.g., in which air and/or fluid may traverse the plurality of vents 118) and a closed position (e.g., in which the plurality of vents 118 are sealed to the panel 111 or insulated panel 112). In these embodiments, the plurality of vents 118 may include a louver configuration, in which the plurality of vents 118 include a plurality of slits and/or blades that may be tilted to control air and/or fluid flow through each of the plurality of vents. For example, in these embodiments, the plurality of slits and/or blades may be mechanically coupled to a sliding lever, a knob, or other similar translation mechanism capable of moving the plurality of slits and/or blades such that each of the plurality of vents 118 may be translated between the open position and the closed position.

In other embodiments, the plurality of vents 118 may include a sliding or rotating mechanism, such as a sliding panel, that may be used to translate the plurality of vents 118 between the open position and the closed position. Furthermore, in other embodiments still, the plurality of vents 118 may be configured to automatically translate between the open position and the closed position in response to certain environmental parameters being met. For example, in these embodiments, the plurality of vents 118 may include a controller and a sensor mechanism configured to determine a temperature, a humidity level, or another similar environmental parameter. In these embodiments, when the environmental parameters meets and/or exceeds a predetermined threshold, the controller may translate the plurality of vents 118 between the open position and the closed position (or vice versa) or may translate the plurality of vents 118 such that the plurality of vents 118 are moved to a position between the open position and the closed position (e.g., to allow partial airflow through the plurality of vents 118).

Referring again to the kits described herein, it should be further appreciated that, top trim front, the top trim back, and the j-track may be formed of a polymer, such as polyvinyl chloride (PVC), acrylonitrile butadiene styrene (ABS), polyethylene, polypropylene, polycarbonate, thermoplastic elastomers, or any other suitable polymer without departing from the scope of the present disclosure.

Although a variety of exemplary kits have been described herein, particularly with reference to FIGS. 2, 4, 7-8, 12, and 17-22, it should be appreciated that the disclosed kits are merely exemplary in nature and are not intended to limit the scope of the present disclosure. For example, the kit may include any combination of components described herein without departing from the scope of the present disclosure.

Other embodiments can include one or more of the following items:

Item 1. A kit for a perimeter barrier for a building, the kit comprising: a panel; a j-track configured to be coupled to a bottom of the panel; a top track coupled to the building such that the top track is secured to an upper portion of the panel; a top h-track configured to be coupled to the panel and the top track; and a bottom h-track configured to be mounted to the panel and the j-track.

Item 2. The kit of item 1, further comprising a z-vent coupled to the building such that the z-vent is secured to an upper portion of the panel.

Item 3. The kit of item 1 or 2, further comprising a door configured to be installed in the top h-track and the bottom h-track to provide access through the perimeter barrier to a space beneath the building.

Item 4. The kit of any of items 1-3, wherein the door is configured to be slidably mounted in the top h-track and the bottom h-track to move left or right relative to the top h-track and the bottom h-track.

Item 5. The kit of any of items 1-4, wherein the door is configured to be vertically lifted into a slot in the top h-track, and a bottom of the door is configured to be removed from the bottom h-track to remove the door from the perimeter barrier.

Item 6. The kit of any of items 1-5, wherein the door is formed of metal.

Item 7. The kit of any of items 1-6, wherein the panel comprises metal and has apertures for ventilation.

Item 8. The kit of any of items 1-7, wherein the apertures are partially punched, such that punched portions of the panels cover the apertures.

Item 9. The kit of any of items 1-8, further comprising a corner configured to be located at a corner intersection of the perimeter barrier.

Item 10. The kit of any of items 1-9, wherein the corner comprises a perpendicular section having sides, a wall extends from each side of the perpendicular section, and a mounting flange extends from each of the walls, such that the mounting flanges are parallel to respective sides of the perpendicular section.

Item 11. A kit for a perimeter barrier for a building, the kit comprising: a ventilated panel; a top trim back comprises an upper end configured to be mounted to the building and the top trim back comprises an upper slot on a front face thereof; a top trim front comprises an upper portion configured to be snapped into the upper slot of the top trim back to secure an upper portion of the ventilated panel between the top trim back and the top trim front; and a j-track configured to receive and secure a bottom of the ventilated panel.

Item 12. The kit of item 11, wherein the ventilated panel is perforated.

Item 13. The kit of item 11 or 12, further comprising a corner configured to be installed at a corner intersection of the perimeter barrier.

Item 14. The kit of any of items 11-13, wherein the corner comprises a perpendicular section having sides, a wall extends from each side of the perpendicular section, and a mounting flange extends from each of the walls, such that the mounting flanges are parallel to respective sides of the perpendicular section.

Item 15. The kit of any of items 11-14, wherein the ventilated panel is metal, and the top trim front, the top trim back and the j-track comprise a polymer.

Item 16. The kit of any of items 11-15, further comprising a door.

Item 17. The kit of any of items 11-16, wherein the door is configured to be slidably mounted to move left or right relative to the perimeter barrier.

Item 18. A kit for a perimeter barrier for a building, the kit comprising: a panel; a top trim back comprises an upper end configured to be mounted to the building and the top trim back comprises an upper slot on a front face thereof; a top trim front comprises an upper portion configured to be snapped into the upper slot of the top trim back to secure an upper portion of the panel between the top trim back and the top trim front; a j-track configured to receive and secure a bottom of the panel; and an insulated panel configured to be installed behind the panel.

Item 19. The kit of item 18, further comprising a door configured to be vertically lifted into a slot in the perimeter barrier, and a bottom of the door is configured to be removed from the perimeter barrier to remove the door from the perimeter barrier.

Item 20. The kit of item 18 or 19, wherein the insulated panel includes a plurality of vents configured to move between an open position and a closed position.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. A kit for a perimeter barrier for a building, the kit comprising:
    a panel;
    a j-track configured to be coupled to a bottom of the panel;
    a top track configured to be coupled to the building such that the top track is securable to an upper portion of the panel;
    a top h-track configured to be coupled to the panel and the top track; and
    a bottom h-track configured to be mounted to the panel and the j-track, the bottom h-track including a flange;
    wherein the bottom h-track is configured to be mounted to the panel and the j-track such that the flange is configured to be received within the j-track and positioned between the panel and the j-track such that the flange abuts both of the panel and the j-track, and a portion of the bottom h-track from which the flange extends abuts the panel.

2. The kit of claim 1, further comprising a z-vent configured to be coupled to the building such that the z-vent is securable to an upper portion of the panel.

3. The kit of claim 1, further comprising a door configured to be installed in the top h-track and the bottom h-track to provide access through the perimeter barrier to a space beneath the building.

4. The kit of claim 3, wherein the door is configured to be slidably mounted in the top h-track and the bottom h-track to move left or right relative to the top h-track and the bottom h-track.

5. The kit of claim 3, wherein the door is configured to be vertically lifted into a slot in the top h-track, and a bottom of the door is configured to be removed from the bottom h-track to remove the door from the perimeter barrier.

6. The kit of claim 3, wherein the door is formed of metal.

7. The kit of claim 1, wherein the panel comprises metal and has apertures for ventilation.

8. The kit of claim 7, wherein the apertures are partially punched, such that punched portions of the panels cover the apertures.

9. The kit of claim 1, further comprising a corner configured to be located at a corner intersection of the perimeter barrier.

10. The kit of claim 9, wherein the corner comprises a perpendicular section having sides, a wall extends from each side of the perpendicular section, and a mounting flange extends from each of the walls, such that the mounting flanges are parallel to respective sides of the perpendicular section.

11. A kit for a perimeter barrier for a building, the kit comprising:
    a ventilated panel;
    a top trim back comprises an upper end configured to be mounted to the building and the top trim back comprises an upper slot on a front face thereof;
    a top trim front comprises an upper portion configured to be snapped into the upper slot of the top trim back;
    a top h-track configured to be positioned between the top trim front and the top trim back such that the top h-track abuts each of the top trim front and the top trim back, the top-h-track being further configured to secure an upper portion of the ventilated panel in a space defined within the top h-track, such that the upper portion of the ventilated panel is further positioned between the top trim back and the top trim front; and
    a j-track configured to receive and secure a bottom of the ventilated panel.

12. The kit of claim 11, wherein the ventilated panel is perforated.

13. The kit of claim 11, further comprising a corner configured to be installed at a corner intersection of the perimeter barrier.

14. The kit of claim 13, wherein the corner comprises a perpendicular section having sides, a wall extends from each side of the perpendicular section, and a mounting flange extends from each of the walls, such that the mounting flanges are parallel to respective sides of the perpendicular section.

15. The kit of claim 11, wherein the ventilated panel is metal, and the top trim front, the top trim back and the j-track comprise a polymer.

16. The kit of claim 11, further comprising a door.

17. The kit of claim 16, wherein the door is configured to be slidably mounted to move left or right relative to the perimeter barrier.

18. A kit for a perimeter barrier for a building, the kit comprising:
 a panel;
 a top trim back comprises an upper end configured to be mounted to the building and the top trim back comprises an upper slot on a front face thereof;
 a top trim front comprises an upper portion configured to be snapped into the upper slot of the top trim back to secure an upper portion of the panel in a space defined between the top trim back and the top trim front, such that the upper portion of the panel is positioned between the top trim back and the top trim front and directly abuts the top trim front;
 a j-track configured to receive and secure a bottom of the panel; and
 an insulated panel configured to be installed behind the panel and separately from the panel, such that a space is formed between the insulated panel and the panel when the insulated panel is installed;
 wherein the insulated panel includes an upper edge that directly abuts the top trim back and is fastenable to the top trim back and a lower edge configured to be received within the j-track.

19. The kit of claim 18, further comprising a door configured to be vertically lifted into a slot in the perimeter barrier, and a bottom of the door is configured to be removed from the perimeter barrier to remove the door from the perimeter barrier.

20. The kit of claim 18, wherein the insulated panel includes a plurality of vents configured to move between an open position and a closed position.

\* \* \* \* \*